US008412952B1

United States Patent
Ramzan et al.

(10) Patent No.: US 8,412,952 B1
(45) Date of Patent: Apr. 2, 2013

(54) SYSTEMS AND METHODS FOR AUTHENTICATING REQUESTS FROM A CLIENT RUNNING TRIALWARE THROUGH A PROOF OF WORK PROTOCOL

(75) Inventors: Zulfikar Ramzan, Cupertino, CA (US);
Walter Bogorad, Danville, CA (US);
Vijay Seshadri, Milpitas, CA (US);
Vadim Antonov, Belmont, CA (US);
Pieter Viljoen, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 657 days.

(21) Appl. No.: 12/436,633

(22) Filed: May 6, 2009

(51) Int. Cl.
G06F 11/30 (2006.01)
G06F 12/14 (2006.01)

(52) U.S. Cl. ...................................................... 713/189

(58) Field of Classification Search ................... 713/189
See application file for complete search history.

(56) References Cited

U.S. PATENT DOCUMENTS

| 8,171,562 | B2 * | 5/2012 | Feng | 726/27 |
| 8,332,920 | B2 * | 12/2012 | Kass | 726/7 |
| 2006/0069804 | A1 * | 3/2006 | Miyake et al. | 709/237 |
| 2007/0277248 | A1 * | 11/2007 | Agrawal et al. | 726/30 |

* cited by examiner

Primary Examiner — Edan Orgad
Assistant Examiner — Harris Wang
(74) Attorney, Agent, or Firm — Holland & Hart LLP (57) ABSTRACT

A computer-implemented method for authenticating requests from a client running trialware through a proof of work protocol is described. A request received from a client running trialware is analyzed. A cryptographic puzzle is generated if an authentication token is not included with the request. The cryptographic puzzle is transmitted to the client. A solution to the cryptographic puzzle received from the client is analyzed. A response to the request is generated if the received solution to the puzzle is validated.

18 Claims, 8 Drawing Sheets

SYSTEMS AND METHODS FOR AUTHENTICATING REQUESTS FROM A CLIENT RUNNING TRIALWARE THROUGH A PROOF OF WORK PROTOCOL

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors.

Computer systems may function as information management systems. For example, a server may provide information about files or other data to client computer systems. A client may send a request to a server querying whether a particular file is malicious or non-malicious. In addition, the client may request information from the server regarding a particular website. The back-end (i.e., server) may perform an analysis of the files, websites, data, etc., in order to provide a response to the client.

Vendors of computer products (e.g., software) may offer a trial version of the product (i.e., trialware). A user may install the trial version on the client in order to determine whether or not to purchase the full version of the product. The trial version may be accessed by the user for a predetermined period of time. The trial version may offer as many of the functions as possible that the full version offers to the user. Offering the maximum amount of functions and options to the user through the trial version may increase the likelihood that the trial user will ultimately purchase the full version. Vendors, however, lack the capability of tracking malicious users that use such trial versions. For example, a malicious user may install a trial version of software and make repeated queries to a back-end server with the goal of scraping or mining information from the server. The trial version of software may not include authentication safeguards to prevent such attacks. As a result, benefits may be realized by providing system and methods for authenticating requests from a client running trialware through a proof of work protocol.

SUMMARY

According to at least one embodiment, a computer-implemented method for authenticating requests from a client running trialware through a proof of work protocol is described. A request received from a client running trialware may be analyzed. A cryptographic puzzle may be generated if an authentication token is not included with the request. The cryptographic puzzle may be transmitted to the client. A solution to the cryptographic puzzle may be received from the client is analyzed. A response to the request may be generated if the received solution to the puzzle is validated.

In one embodiment, an authentication policy may be applied if an authentication token is included with the request. State information may be received with the solution to the cryptographic puzzle. In one configuration, the received state information may be validated. In one example, the request from the client may be ignored if the received solution to the puzzle is not validated.

A key exchange procedure with the client may be performed to establish a confidential channel with the client. In one embodiment, an authentication token may be transmitted over the confidential channel to the client if the received solution to the puzzle is validated. The authentication token may include an encoded expiration date that coincides with the end of a trial period associated with the trialware. In one embodiment, the received solution to the cryptographic puzzle may be validated using a cryptographic hash function. State information may be encoded within the cryptographic puzzle. In one embodiment, the state information includes a server timestamp.

A computer system configured to authenticate requests from a client running trialware through a proof of work protocol is also described. The system may include a processor and memory in electronic communication with the processor. The system may further include a request analyzer configured to analyze a request received from a client running trialware, and a puzzle generator configured to generate a cryptographic puzzle if an authentication token is not included with the request. In addition, the system may include a communication interface configured to transmit the cryptographic puzzle to the client, and a solution analyzer configured to analyze a solution to the cryptographic puzzle received from the client. Further, the system may include a response generator configured to generate a response to the request if the received solution to the puzzle is validated.

A computer-program product for authenticating requests from a client running trialware through a proof of work protocol is also described. The computer-program product may include a computer-readable medium having instructions thereon. The instructions including code programmed to receive a request from a client running trialware, and code programmed to generate a cryptographic puzzle if an authentication token is not included with the request. The instructions may also include code programmed to transmit the cryptographic puzzle to the client, and code programmed to analyze a solution to the cryptographic puzzle received from the client. The instructions may further include code programmed to generate a response to the request if the received solution to the puzzle is validated.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

A number of computer-related products operating on a back-end data provider (i.e., a server) may provide information to a data requester (i.e., a client) through a cloud-based computing environment. Cloud computing may be Internet based development and use of computer technology. In one example, cloud style computing may be dynamically scalable. In addition, virtualized resources may be provided as a service over the Internet. Users operating in a cloud-based environment need not have knowledge of, expertise in, or control over the technology infrastructure "in the cloud" that supports them.

One critical challenge in such an environment (or any similar cloud-based computing environment) is that a malicious user might issue requests to a cloud-based service provided by a back-end server. These requests might serve to scrape or mine information from the back-end server. Current systems may attempt to alleviate this concern by requiring some type of verifiable token value to accompany each request. This requirement may limit the requests received at the server to only those requests that are accompanied by a valid token. Unfortunately, it may be difficult to issue a token to each client in many practical scenarios. For example, a trial version of a computer-related product (i.e., trial software) may be downloaded to the client from the back-end server. In one embodiment, the trial software may not contact the back-end server to register the software (and thereby receive an authentication token) until the user decides to purchase the software.

Vendors of software, however, may desire that a trial software version have all of the functionality of a full software version so that the trial user is able to fully experience the software during the trial period. Experiencing the full capabilities of the software during the trial period may influence the trial user's decision on whether to purchase the full software version at the conclusion of the trial period. Providing a trial version of software that is fully functional, however, implies that a trial user may submit requests to the back-end server without an authentication token because the trial version of the software may not be associated with a token. As such, the back-end server may be at risk of database scraping or information mining from requests submitted by users of trial software. The present systems and methods overcome these challenges by accommodating trial users through proof of work protocols.

Figure 1:
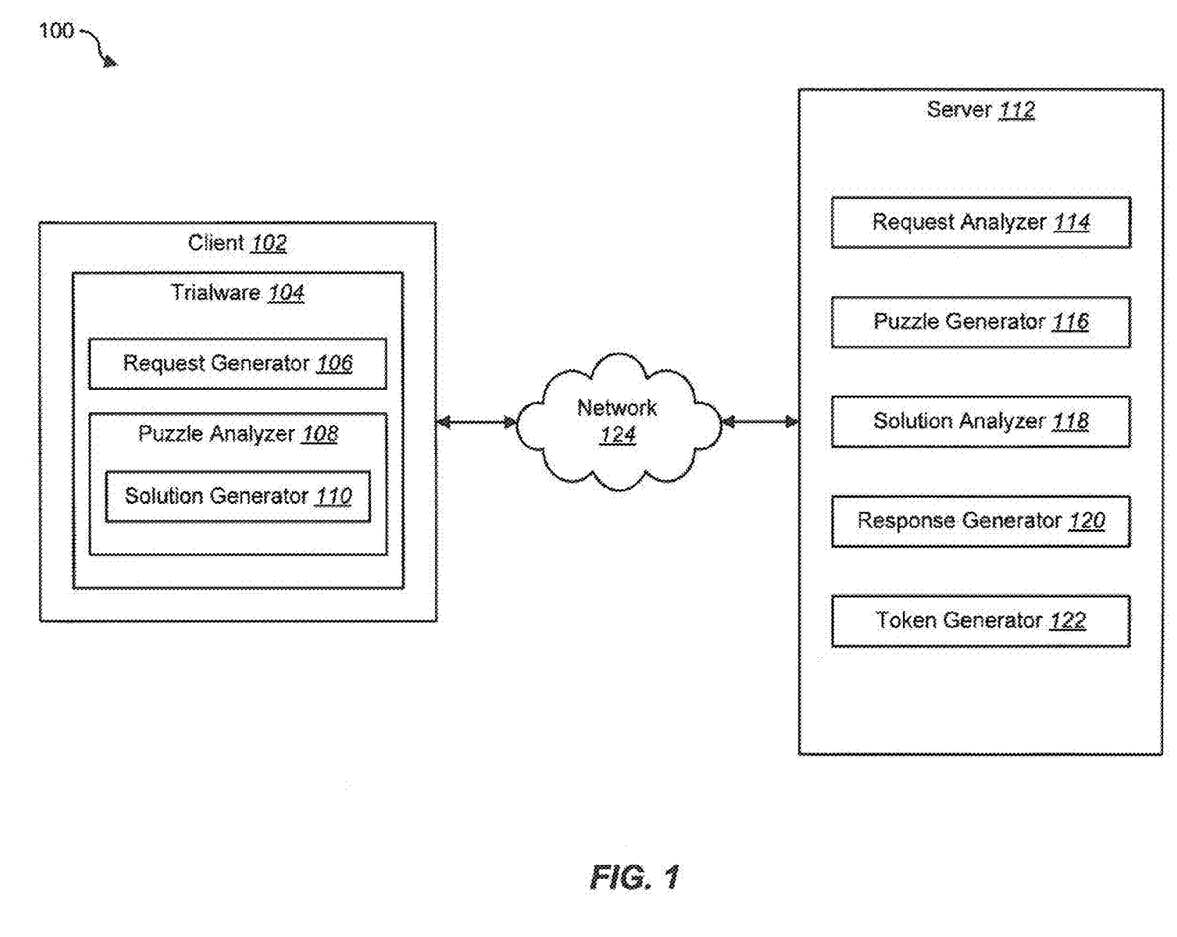
FIG. 1 is a block diagram illustrating one embodiment of a client-server environment in accordance with the present systems and methods.

FIG. 1 is a block diagram illustrating one embodiment of a client-server environment 100 in accordance with the present systems and methods. In one configuration, a client 102 and a server 112 may communicate over a network connection 124. In one example, trialware 104 may be installed on the client 102. Trialware 104 may be a trial version of software that runs on the client 102 for a predetermined period of time. For example, a user may determine whether to purchase a full version of the software based on the performance of the trialware 104.

In one embodiment, the trialware 104 may include a request generator 106. The generator 106 may generate requests to be sent to the server 112. The requests may be for information regarding a particular data file or another type of information. For example, the request may be a query as to whether a particular data file is malicious or has malicious characteristics. The trialware 104 may also include a puzzle analyzer 108. The analyzer 108 may analyze a cryptographic puzzle that may be sent from the server 112. A solution generator 110 may generate a solution to the puzzle and the solution may be transmitted back to the server 112.

In one configuration, the server 112 may include a request analyzer 114 that analyzes requests received from the client 102. For example, the analyzer 114 may determine whether an authentication token accompanied the request. The server 112 may also include a cryptographic puzzle generator 116. The generator 116 may generate a puzzle to transmit to the client 102 before a response to the request is generated. For example, the puzzle generator 116 may generate a puzzle if a request received from the client 102 is not accompanied by an authentication token.

The server 112 may also include a solution analyzer 118. In one example, the solution analyzer 118 may analyze puzzle solutions received from the client 102. The analyzer 118 may determine whether the received solution is correct. Further, the server 112 may include a response generator 120. The generator 120 may generate a response to a request (or query) sent from the client 102. A response may be generated if the request analyzer 114 determines the request is accompanied by an authentication token. In addition, the generator 120 may generate a response if the solution analyzer 118 indicates that a puzzle solution received from the client 102 is correct.

In one embodiment, the server 112 may also include a token generator 122. The generator 122 may generate an authentication token to be transmitted to the client 102. In one embodiment, a full version client that has installed a full version of a software product may contact the server 112 to register the software. As part of the registration process, the generator 122 may generate an token to be sent to the full version client. The full version client may then associate this token with requests sent to the server 112. In another embodiment, a trial version client (such as the client 102) that has installed a trial version of software installed (i.e., trialware 104) may transmit a solution to a cryptographic puzzle. The token generator 122 may generate an authentication token for the trial version client 102 if the solution is correct. In this example, the client 102 may use the authentication token to accompany subsequent requests that are transmitted to the server 112 during the trial period of the trialware 104.

Figure 2:
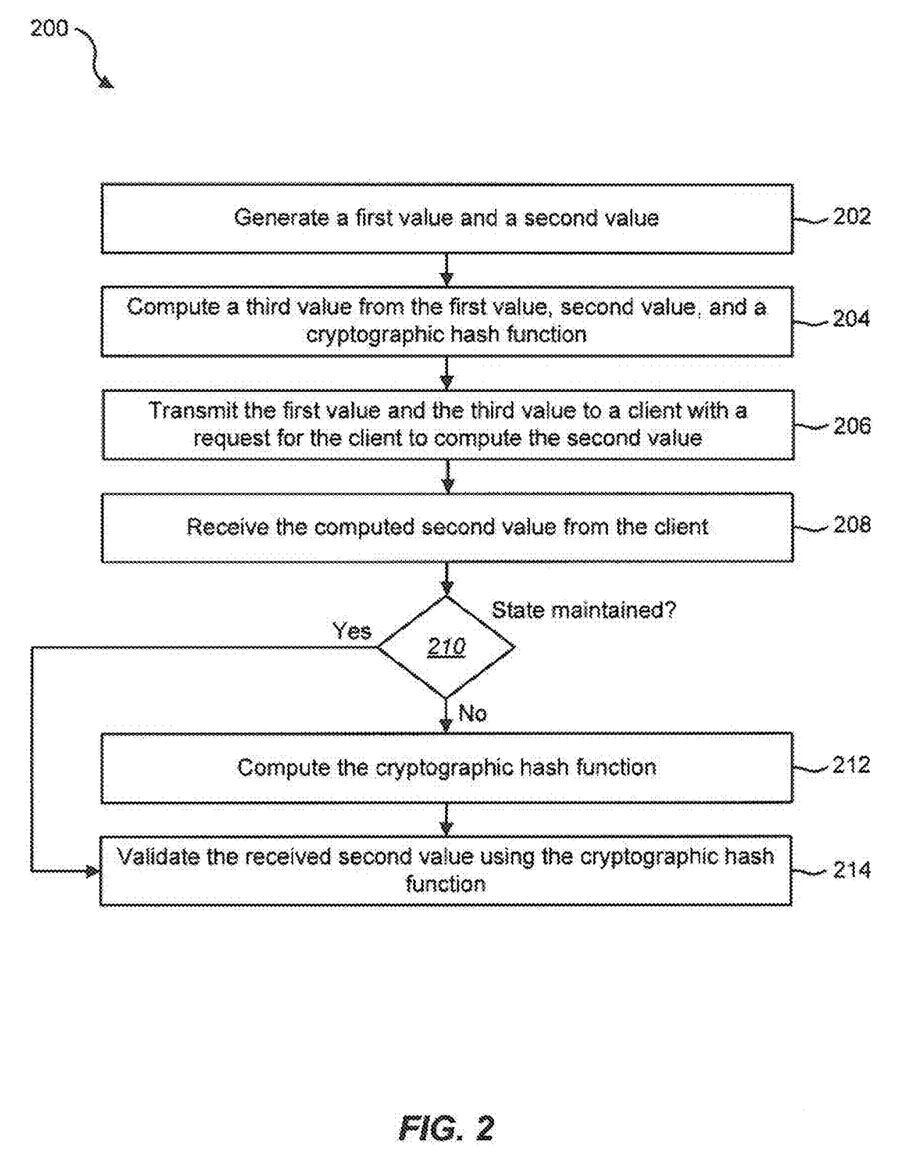
FIG. 2 is a flow diagram illustrating one embodiment of a method for generating a cryptographic puzzle.

FIG. 2 is a flow diagram illustrating one embodiment of a method 200 for generating a cryptographic puzzle. In one configuration, the method 200 may be implemented by the server 112.

In one embodiment, a first value and a second value may be generated 202. For example, the server 112 may generate 202 a first value, \$h\$, and a second value, \$a\$. In one configuration, the value \$a\$ may be relatively small in size (e.g., 20 bits). The value $h$ may be larger in size (e.g., 492 bits). A third value may be computed 204 from the first value, the second value, and a cryptographic hash function. For example, the server 112 may compute $q$ using $a$, $h$, and the hash function SHA-1. In one embodiment, the third value, $q$, may be computed 204 as:

$$q\$=SHA-1(\$a\$\|\$h\$) \quad \text{Equation (1)}$$

In one configuration, the first value ($h$) and the third value ($q$) may be transmitted 206 to a client 102 with a request for the client 102 to compute the second value ($a$). Given only the first value and the third value, the client 102 may determine the second value by attempting all possible $2^{20}$ values that the second value may be. In other words, the client 102 may cycle through candidate values $a\_1$, $a\_2$, etc., and compute the following:

$$q\_i\$=SHA-1(\$a\_i\$\|\$h\$) \quad \text{Equation (2)}$$

The client 102 may continue to cycle through candidate values until it finds a match, $m$, where $q\_m$=$q$. When such a match occurs, the client 102 may return the value $a\_m$ as the computed second value. In one embodiment, the computed second value may be received 208 from the client. A determination 210 may be made as to whether the state of the sever 112 has been maintained since the first value and the third value were transmitted 206 to the client. If the state has been maintained, the received second value may be validated 214 using the cryptographic hash function (e.g., SHA-1) that was used to compute 204 the third value. If it is determined 210 that state has not been maintained, the cryptographic hash function may be computed 212 and the second value received from the client may be validated 214 using the hash function.

In one embodiment, other hash functions may be used. For example, cryptographic hash functions SHA-2, Tiger, etc. may be used to generate the puzzle. In addition, the size of the second value, $a$, may vary depending on the application and the amount of computation the server 112 requires the client 102 to perform. In one embodiment, the larger in size the second value is, the more difficult it will be for the client 102 to solve the puzzle.

The encoding of the first value, $h$, may vary as well. For example, as stated above, the size of $h$ may be 492 bits. In one example, the last 300 bits of $h$ may be equal to zero. If the client 102 and server 112 are aware of this encoding, the server 112 may not need to send the full 492 bits to the client 102. Instead, the server 112 may transmit 192 bits and the client 102 may append 300 zeros to the end. This implementation may reduce the communication overhead between the server 112 and the client 102. Further, the encoding of $h$ may include relevant state information. For example, the encoding of $h$ may include the Internet Protocol (IP) address of the client 102, a server-generated timestamp, or a variety of other information. The additional information encoded in the first value, $h$, may allow the server 112 to avoid having to maintain state while the client 102 computes the second value, $a$.

Figure 3:
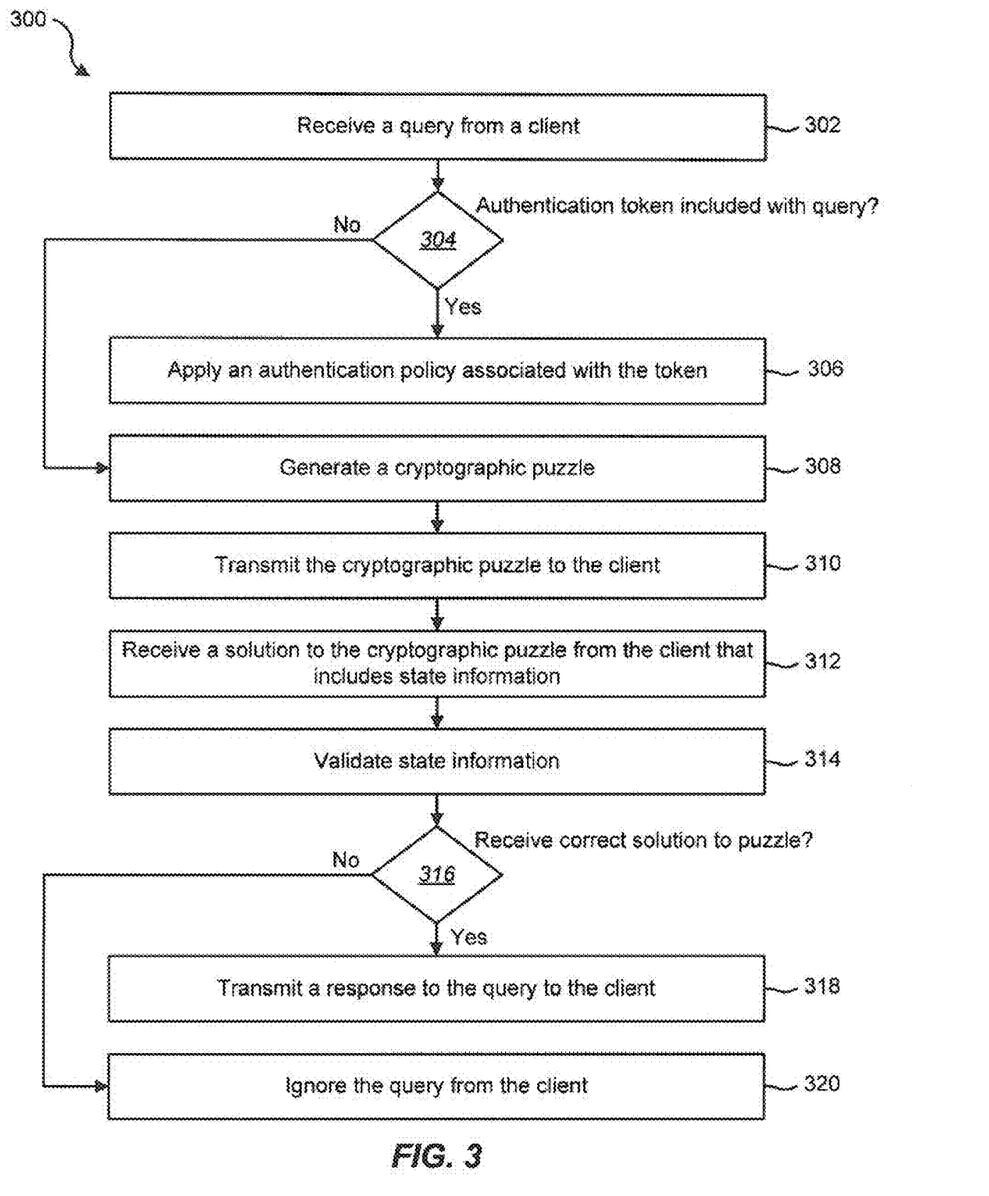
FIG. 3 is a flow diagram illustrating one embodiment of a method for validating requests from a client running trialware through proof of work protocols.

FIG. 3 is a flow diagram illustrating one embodiment of a method 300 for validating requests from a client 102 running trialware through proof of work protocols. The method 300 may be implemented by the back-end server 112. In one embodiment, a query may be received 302 from a client 102. The query may be a request for information regarding a particular data file. A determination 304 may be made as to whether an authentication token is included with the query. If a token is included, an authentication policy associated with the token may be applied 306. For example, if the token is validated, a response to the query may be generated and transmitted to the client 102. If the token is not valid (or has exhibited potentially malicious patterns), the query may be ignored.

If it is determined 304 that the query does not include an authentication token, a cryptographic puzzle may be generated 308. For example, the query may be accompanied by a stub value rather than an authentication token. The generated puzzle may be as follows:

$$q\$=H(\$a\$\|\$h\$) \quad \text{Equation (3)}$$

In one example, the variable "H" above in Equation (3) may be a cryptographic hash function, such as SHA-1, SHA-2, Tiger, etc. In one configuration, the value $h$ may include some unpredictable bits through the use of a pseudorandom number generator or another high-entropy source. The unpredictable bits of the value $h$ may prevent a client 102 from pre-computing puzzle solutions. In addition, the value $h$ may include a server timestamp or other types of state information.

In one embodiment, the cryptographic puzzle may be transmitted 310 to the client 102. For example, the values $q$ and $h$ from Equation (3) may be transmitted 310 the client 102. The client 102 may compute a solution to the puzzle. For example, the client 102 may compute a value $a'$ such that the following is satisfied.

$$q\$=H(\$a'\$\|\$h\$) \quad \text{Equation (4)}$$

In one embodiment, a certain degree of non-trivial computation effort may be required in order for the client 102 to generate a solution to the puzzle. To generate a single solution, the computational overhead may be largely unnoticed by the client 102. If the client 102, however, is a malicious client and sent repeated requests to the server 112, the client 102 would be required to solve a large number of puzzles, which may be infeasible. In other words, the client 102 may be able to make a single request (and generate a single solution to the puzzle), but it may be more difficult to send the large number of requests necessary for the client 102 to scrape data from the server 112.

The server 112 may receive 312 a solution to the cryptographic puzzle from the client 102. In one embodiment, the solution may include the value $a'$. In addition, the server 112 may receive the values $q$ and $h$, which may include state information. In one example, the client 102 may transmit the values $q$ and $h$ to eliminate the need for the server 112 to maintain any type of state.

In one embodiment, the state information may be validated 314 if the values $q$ and $h$ are received by the server 112. For example, if $h$ includes a server timestamp, the server 112 may validate 314 that the query is reasonably fresh and not the result of a replay. A determination 316 may then be made as to whether a correct solution to the puzzle is received. For example, the server 112 may determine 316 if Equation (4) is satisfied. If the correct solution to the puzzle is received, a response to the query may be transmitted 318 to the client 102. If it is determined 316, however, that the received solution is not the correct solution to the puzzle, the query from the client may be ignored 320.

Figure 4:
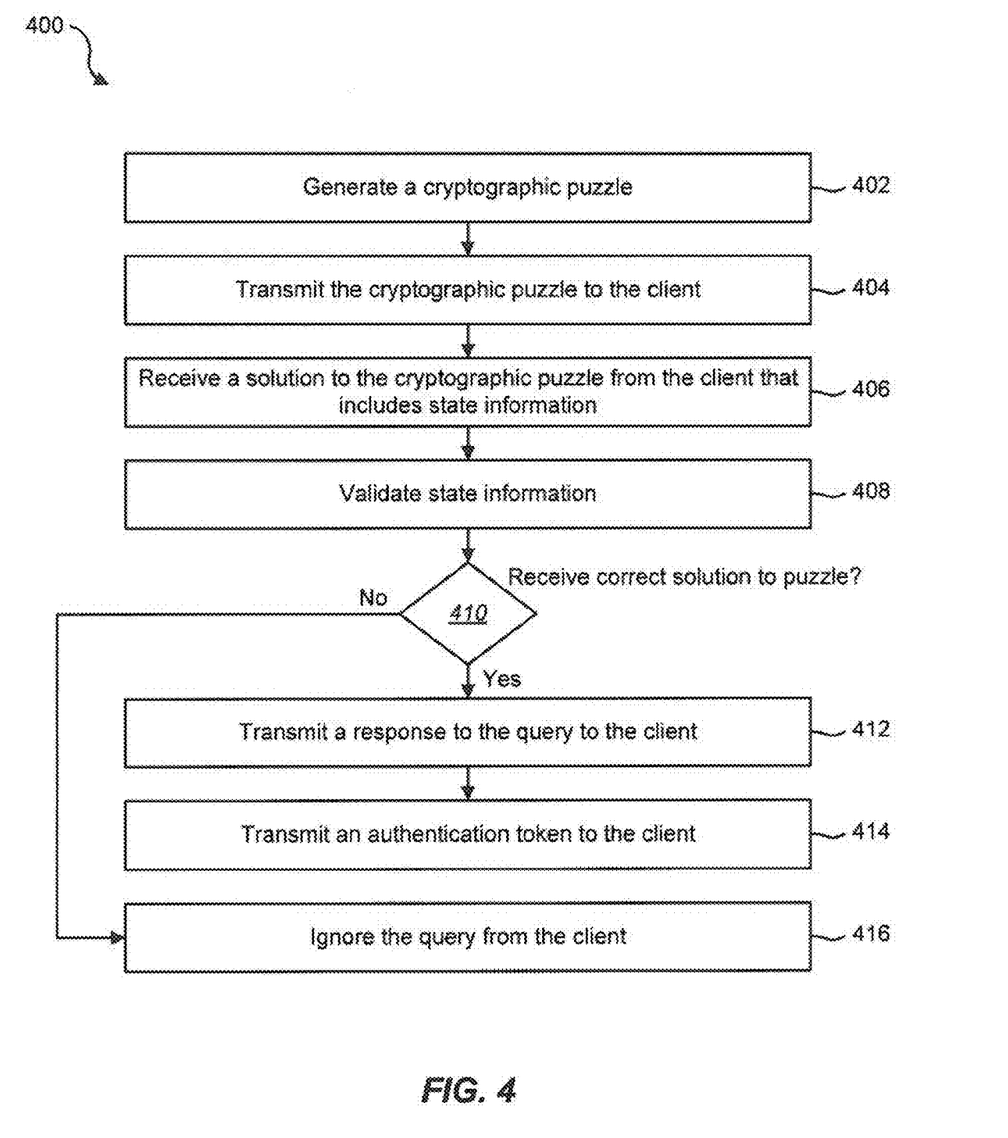
FIG. 4 is a flow diagram illustrating another embodiment of a method for validating requests from a client running trialware through proof of work protocols.

FIG. 4 is a flow diagram illustrating another embodiment of a method 400 for validating requests from a client 102 running trialware through proof of work protocols. The method 400 may be implemented by the back-end server 112. In one embodiment, a cryptographic puzzle may be generated 402 as explained above. The cryptographic puzzle may be transmitted 404 to the client 102.

The server 112 may receive 406 a solution to the cryptographic puzzle from the client 102. In one embodiment, state information included in the received solution may be validated 408. A determination 410 may then be made as to whether a correct solution to the puzzle is received as explained above. If the correct solution to the puzzle is received, a response to the query may be transmitted 412 to the client 102. In addition, an authentication token may be transmitted 414 to the client 102. The client 102 may then use this authentication token with subsequent requests sent to the server 112. Sending a token with subsequent requests may eliminate the need for the client 102 to provide a solution to additional puzzles each time a request is sent. If the client 102 is a trial client (i.e., running trialware 104), the token may include an encoded expiration date that coincides with the end of the trial period for the trialware 104. If it is determined 410, however, that the received solution is not the correct solution to the puzzle, the query from the client may be ignored 416 as previously explained.

Figure 5:
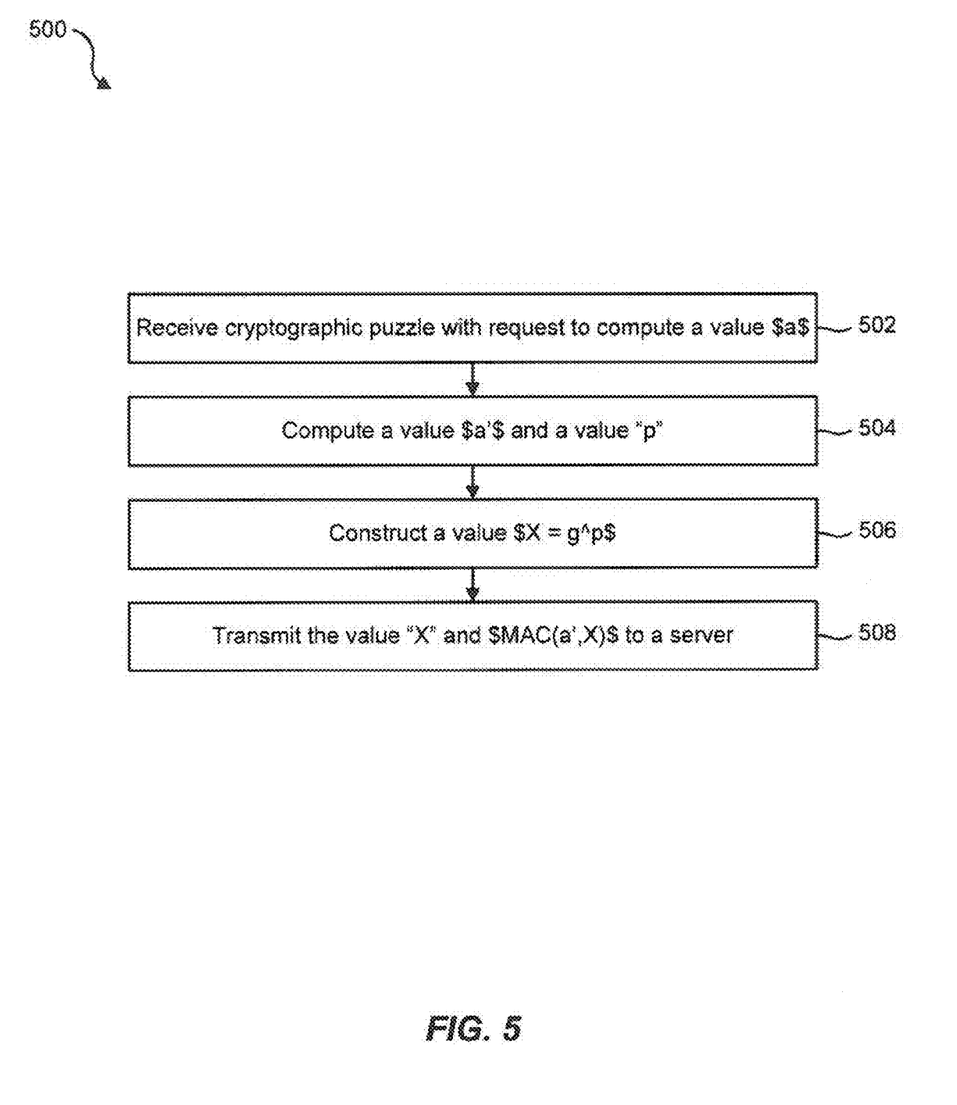
FIG. 5 is a flow diagram illustrating one embodiment of a method for establishing a channel to receive an authentication token.

FIG. 5 is a flow diagram illustrating one embodiment of a method 500 for establishing a channel to receive an authentication token. In one configuration, the method 500 may be implemented by the client 102. In one example, a cryptographic puzzle may be received 502 with a request to compute a value $a$. For example, the received puzzle may be Equation (3) above and the client may receive the values $q$ and $h$ and a request to compute the value $a$. The client 102 may compute 504 a value $a'$ and a value "p". In addition, the client 102 may construct 506 a value $X=g^p$, where "g" may be a generator of a group in which the Discrete Logarithm, as well as the Diffie-Hellman problems, may be conjectured to be hard. In one embodiment, the client 102 may transmit 508 the value "X" to the server 112. In addition, the client 102 may transmit 508 $MAC(a', X)$ to the server 112, where MAC may be a message authentication code, and $a'$ may be the key. As previously stated, $a'$ may be derived as part of the solution to the cryptographic puzzle. In one embodiment, the value $a'$ is relatively short and may be padded in order to achieve the minimum key length necessary for the MAC algorithm.

Figure 6:
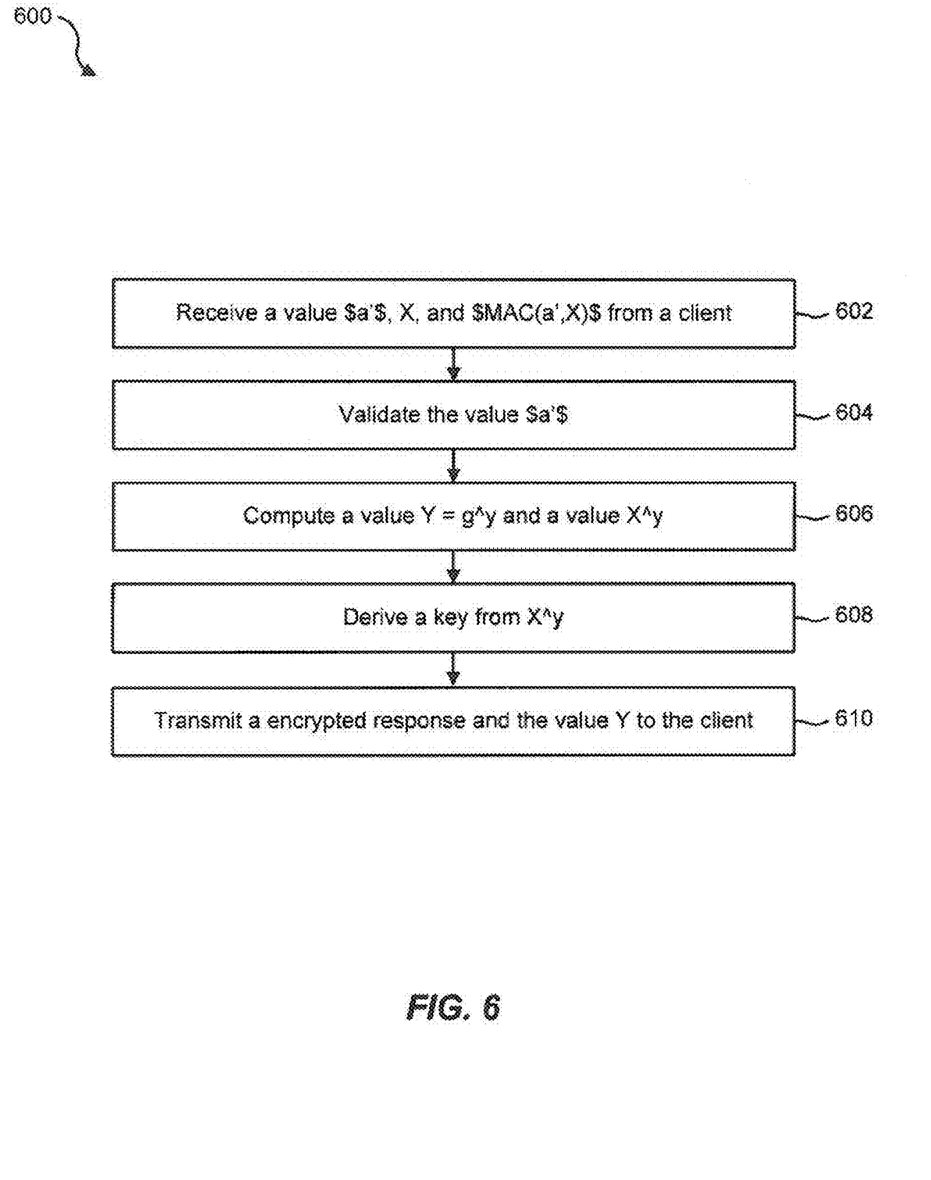
FIG. 6 is a flow diagram illustrating one embodiment of a method for establishing a channel to transmit an authentication token.

FIG. 6 is a flow diagram illustrating one embodiment of a method 600 for establishing a channel to transmit an authentication token. The method 600 may be implemented by the back-end server 112. In one embodiment, the server 112 may receive 602 a value $a'$, a value "X", and $MAC(a', X)$ from a client 102. The server 112 may validate 604 the value $a'$ as a solution to a cryptographic puzzle, as previously explained. In addition, the server 112 may compute 606 a value $Y=g^y$. The server 112 may also compute 606 a value $X^y$ where X is the value received 602 from the client 102. In one embodiment, the server 112 may derive 608 a key from the value $X^y$. The derivation of the key may be accomplished by applying a cryptographic hash function, such as SHA-1, to the value $X^y$ and then taking the least significant N bits. The server may transmit 610 the value Y together with a response to a query received from the client 102. The value Y and the response may be encrypted using the derived key. The value Y may represent the authentication token that the client 102 may now associate with subsequent queries to the server 112.

Figure 7:
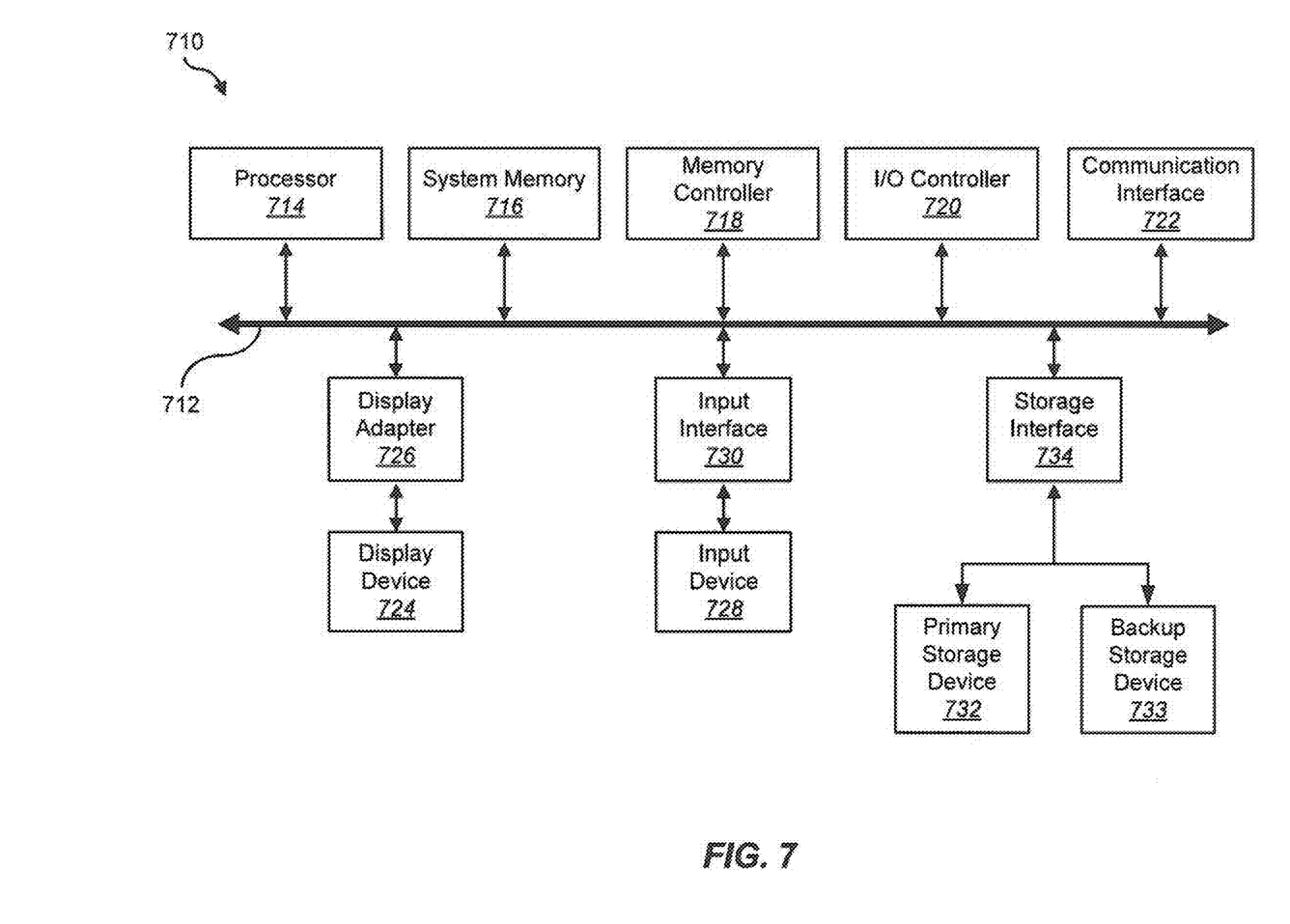
FIG. 7 is a block diagram of an exemplary computing system capable of implementing one or more of the embodiments described and/or illustrated herein.

In one embodiment, the methods described in FIGS. 6-7 may be conducted in two rounds (i.e., four passes). In addition, any MAC algorithm, including the Keyes-Hash Message Authentication Code (HMAC) standard may be used. Similarly, rather then using Diffie-Hellman type key exchange, the client 102 and the server 112 may use another (public-key based) key exchange protocol. For example, the client 102 may provide the server 112 with a copy of its public key (which it may generate on the fly), and the server 112 may encrypt the token either directly or indirectly using this public key. Furthermore, the underlying key exchange mechanism may be based on Password-Authenticated Key Exchange protocols, where a "password" may be replaced with the solution to the puzzle. In another embodiment, the complexity of the puzzle may depend on the nature of the query. For example, if suspicious patterns are occurring from particular IP address ranges, or requests for information seem suspicious, the server 112 may request the client 102 to solve for more bits of the value $a$ (e.g., by using a smaller value of the value $h$).

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the analyzing, generating, and transmitting steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as analyzing, generating, and transmitting.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for analyzing, generating, and transmitting steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the analyzing, generating, and transmitting steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the analyzing, generating, and transmitting steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Storage devices 732 and 733 may also be used, for example, to perform and/or be a means for performing, either alone or in combination with other elements, one or more of the analyzing, generating, and transmitting steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
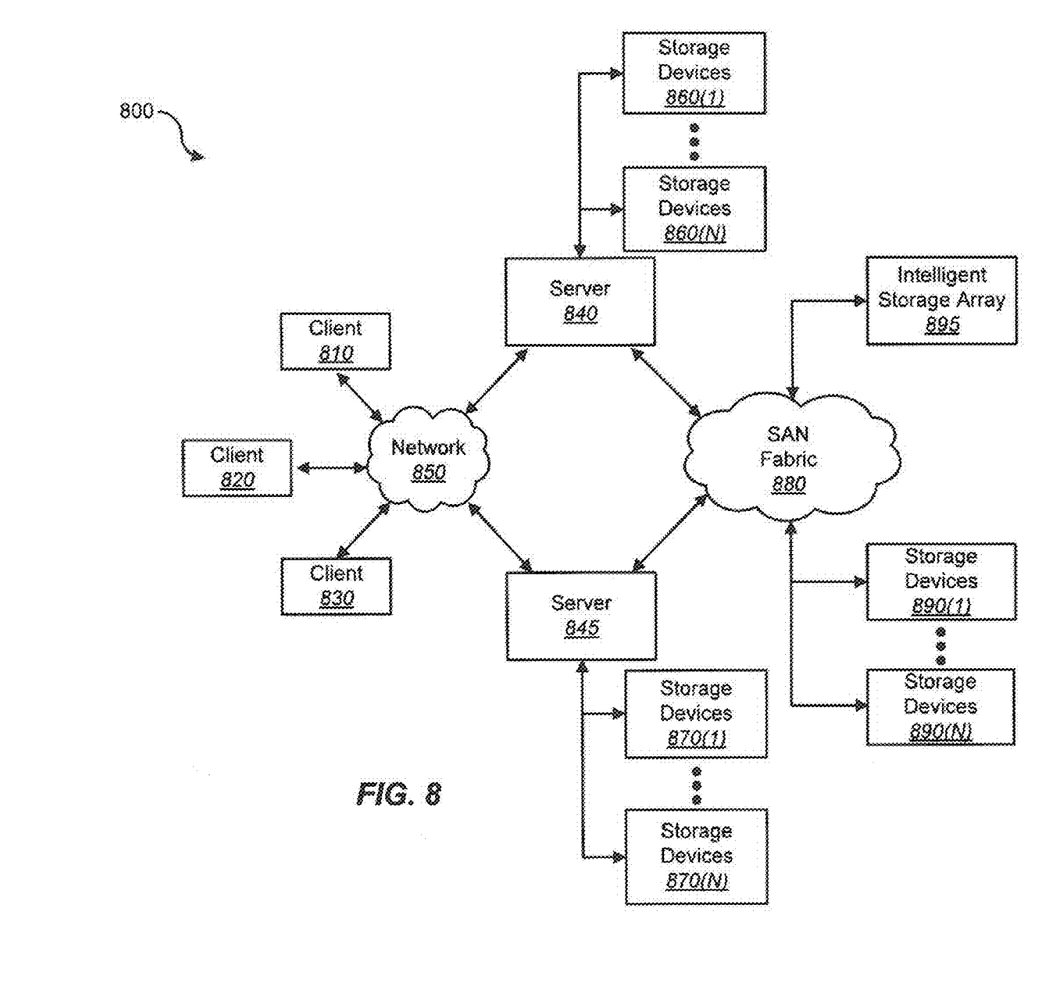
FIG. 8 is a block diagram of an exemplary network architecture in which client systems and servers may be coupled to a network.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or to run certain software applications. Network 850 generally represents any telecommunication or computer network; including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the analyzing, generating, and transmitting steps disclosed herein. Network architecture 800 may also be used to perform and/or be a means for performing other steps and features set forth in the instant disclosure.

As detailed above, computing system 710 and/or one or more of the components of network architecture 800 may perform and/or be a means for performing, either alone or in combination with other elements, one or more steps of the exemplary methods described and/or illustrated herein. For example, computing system 710 and/or one or more of the components of network architecture 800 may perform and/or be a means for performing a computer-implemented method for authenticating requests from a client running trialware through a proof of work protocol that may comprise: 1) analyzing a request received from a client running trialware, 2) generating a cryptographic puzzle if an authentication token is not included with the request, 3) transmitting the cryptographic puzzle to the client, 4) analyzing a solution to the cryptographic puzzle received from the client, and then 5) generating a response to the request if the received solution to the puzzle is validated.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for authenticating requests from a client running trialware through a proof of work protocol, comprising:
   analyzing, by a hardware processor, a request received from a client running trialware;
   determining, by the hardware processor, whether the request is successfully authenticated using an authentication token;
   upon determining that the authentication of the request is unsuccessful, generating, by the hardware processor, a cryptographic puzzle;
   transmitting the cryptographic puzzle to the client;
   receiving state information as at least a part of a solution to the cryptographic puzzle to determine whether a state has been maintained since the cryptographic puzzle was generated;
   upon determining that the state has altered since the cryptographic puzzle was generated, recomputing a hash function to validate the received solution to the puzzle;
   analyzing, by the hardware processor, the solution to the cryptographic puzzle received from the client; and
   generating, by the hardware processor, a response to the request if the received solution to the puzzle is validated.

2. The method of claim 1, further comprising applying an authentication policy if an authentication token is included with the request.

3. The method of claim 1, further comprising validating the received state information.

4. The method of claim 1, further comprising ignoring the request from the client if the received solution to the puzzle is not validated.

5. The method of claim 1, further comprising performing a key exchange procedure with the client to establish a confidential channel with the client.

6. The method of claim 5, further comprising transmitting an authentication token over the confidential channel to the client if the received solution to the puzzle is validated.

7. The method of claim 6, wherein the authentication token comprises an encoded expiration date that coincides with the end of a trial period associated with the trialware.

8. The method of claim 1, further comprising validating the received solution to the cryptographic puzzle using a cryptographic hash function.

9. The method of claim 1, further comprising encoding state information within the cryptographic puzzle, wherein the state information comprises a server timestamp.

10. A computer system configured to authenticate requests from a client running trialware through a proof of work protocol, comprising:
    a processor;
    memory in electronic communication with the processor;
    a request analyzer configured to analyze a request received from a client running trialware, wherein the request analyzer determines whether the request is successfully authenticated using an authentication token;
    a puzzle generator configured to generate a cryptographic puzzle upon determining that the authentication of the request is unsuccessful;
    a communication interface configured to transmit the cryptographic puzzle to the client;
    a solution analyzer configured to receive state information as at least a part of a solution to the cryptographic puzzle to determine whether a state has been maintained since the cryptographic puzzle was generated;
    upon determining that the state has altered since the cryptographic puzzle was generated, the solution analyzer is configured to recompute a hash function to validate the received solution to the puzzle;
    the solution analyzer configured to analyze the solution to the cryptographic puzzle received from the client; and
    a response generator configured to generate a response to the request if the received solution to the puzzle is validated.

11. The computer system of claim 10, wherein the request analyzer is further configured to apply an authentication policy if an authentication token is included with the request.

12. The computer system of claim 10, wherein the solution analyzer is further configured to validate the received state information.

13. The computer system of claim 10, wherein the response generator is further configured to ignore the request from the client if the received solution to the puzzle is not validated.

14. The computer system of claim 10, wherein the processor is further configured to perform a key exchange procedure with the client to establish a confidential channel with the client.

15. The computer system of claim 14, wherein the communication interface is further configured to transmit an authentication token over the confidential channel to the client if the received solution to the puzzle is validated.

16. The computer system of claim 15, wherein the authentication token comprises an encoded expiration date that coincides with the end of a trial period associated with the trialware.

17. The computer system of claim 10, wherein the solution analyzer is further configured to validate the received solution to the cryptographic puzzle using a cryptographic hash function.

18. A computer-program product for authenticating requests from a client running trialware through a proof of work protocol, the computer-program product comprising a non-transitory computer-readable storage medium having instructions thereon, the instructions comprising:
    code programmed to receive a request from a client running trialware;
    code programmed to determine whether the request is successfully authenticated using an authentication token;

upon determining that the authentication of the request is unsuccessful, code programmed to generate a cryptographic puzzle;

code programmed to transmit the cryptographic puzzle to the client;

code programmed to receive state information as at least a part of a solution to the cryptographic puzzle to determine whether a state has been maintained since the cryptographic puzzle was generated;

upon determining that the state has altered since the cryptographic puzzle was generated, code programmed to recompute a hash function to validate the received solution to the puzzle;

code programmed to analyze the solution to the cryptographic puzzle received from the client; and code programmed to generate a response to the request if the received solution to the puzzle is validated.

* * * * *